(12) United States Patent
Theivendran et al.

(10) Patent No.: US 8,660,255 B2
(45) Date of Patent: Feb. 25, 2014

(54) CALL CONTROL ACROSS MULTIPLE INTERFACES

(75) Inventors: Ramesh Theivendran, Scotts Valley, CA (US); Mark Clark, Aptos, CA (US); Gopal Anatharaman, Fremont, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 13/326,112

(22) Filed: Dec. 14, 2011

(65) Prior Publication Data
US 2013/0156177 A1    Jun. 20, 2013

(51) Int. Cl.
*H04M 3/42*    (2006.01)

(52) U.S. Cl.
USPC ............ 379/215.01; 379/201.01; 379/207.06; 379/211.02; 379/212.01

(58) Field of Classification Search
USPC ............. 379/215.01, 201.01, 207.06, 207.07, 379/211.01, 211.02, 212.01, 214.01
See application file for complete search history.

(56) References Cited

U.S. PATENT DOCUMENTS

| | | | |
|---|---|---|---|
| 2003/0133558 A1* | 7/2003 | Kung et al. | 379/215.01 |
| 2006/0187900 A1* | 8/2006 | Akbar | 370/352 |
| 2006/0229108 A1* | 10/2006 | Cehelnik | 455/569.1 |
| 2009/0010246 A1* | 1/2009 | Grattan et al. | 370/352 |
| 2009/0175434 A1* | 7/2009 | Becker | 379/220.01 |

* cited by examiner

*Primary Examiner* — Khai N Nguyen
(74) *Attorney, Agent, or Firm* — Chuang Intellectual Property Law

(57) ABSTRACT

Methods and apparatuses for call control are disclosed. In one example, methods and apparatuses for receiving communications associated with a monitoring of a first interface, a second interface, and a third interface for an incoming call. A current active call is placed in a bold queue, the hold queue configured to contain calls placed on hold received over the first interface, the second interface, and the third interface. Notification of a second user action to place the incoming call on a hold status is received. The incoming call is placed in the hold queue, a next call from the hold queue is retrieved, and the next call is activated.

19 Claims, 9 Drawing Sheets

CALL CONTROL ACROSS MULTIPLE INTERFACES

BACKGROUND OF THE INVENTION

People today typically utilize several devices for voice communications. For example, most people have a mobile phone which may receive and make calls over a cellular communications network. In addition, the use of voice over Internet Protocol (VoIP) has become increasingly popular. Voice over Internet Protocol transmits voice over a data network utilizing Internet Protocol (IP) data packets. In VoIP, analog speech signals received from an audio source are digitized, compressed, and translated into IP packets for transmission over an IP network such as the Internet. Some benefits of VoIP include cost savings and new applications. For example, VoIP can be used to bypass the toll structure imposed by the service providers that operate the public switched telephone network (PSTN). Finally, in the home or office environment, many users may still prefer to use a telephone connected to the public switched telephone network, which may offer higher call quality.

With the use of several telephone devices, the user has several telephone numbers at which he or she can be reached by a calling party. As a result, the situation arises where the user may be on an active call on one device and then receive an incoming call on one or more other devices. In the prior art, the user must physically switch devices to answer the other call. Furthermore, the user may have to end the current call to answer the new incoming call.

The situation may also arise where the user may receive multiple incoming calls simultaneously. In the prior art, it is inconvenient or often infeasible for the user to quickly answer both calls before one of the calls is forwarded to voicemail. The user must therefore typically ignore one of the incoming calls in order to answer the other incoming call.

As a result, there is a need for improved methods and systems for call control across multiple interfaces.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
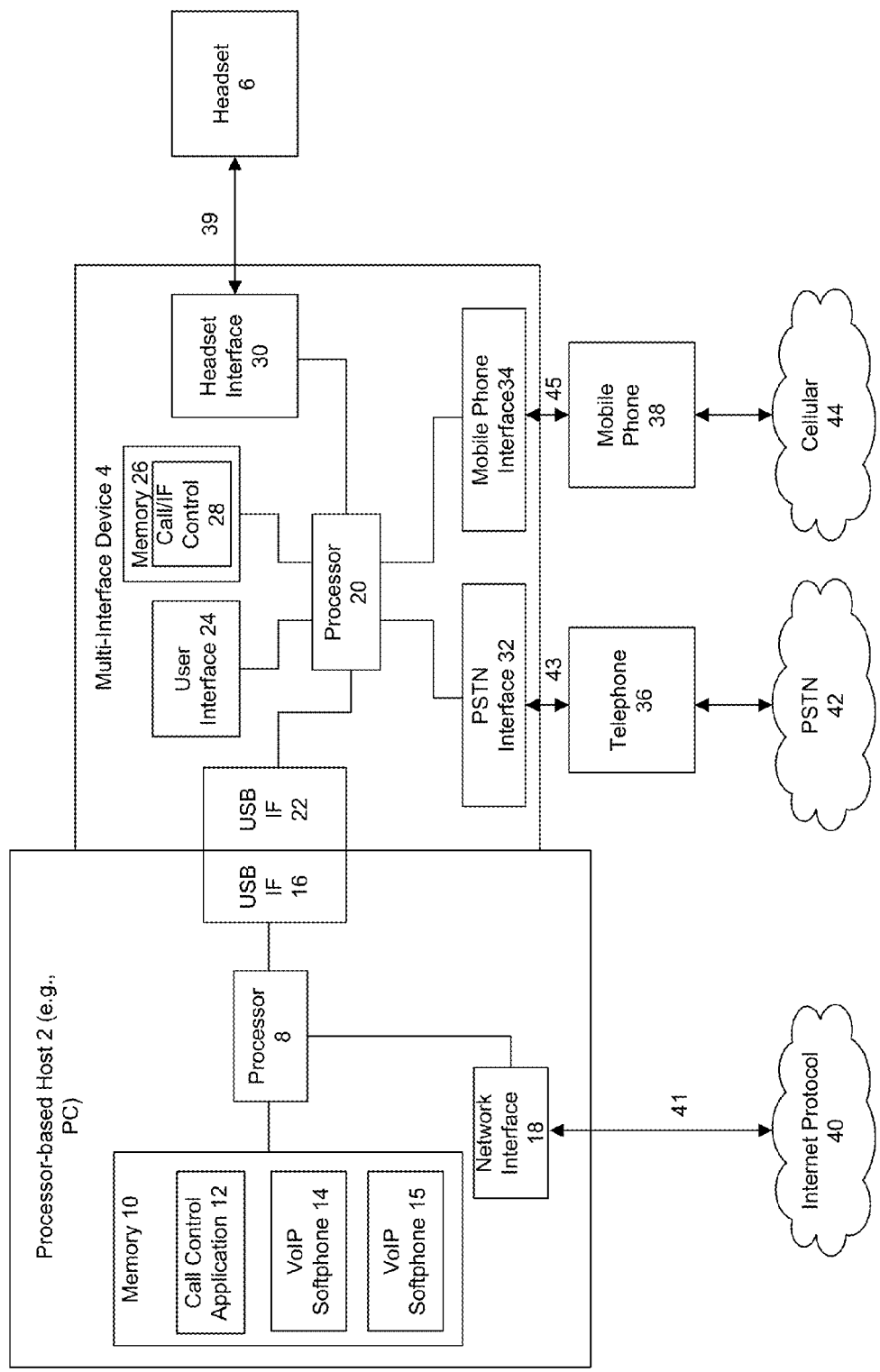
FIG. 1 illustrates a simplified block diagram of a system for telephony call control in one example.

Methods and apparatuses for call control are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

In one example of the invention, methods and systems are described which enable round robin call control between calls across multiple interfaces or between multiple VoIP calls on a single interface.

In one example of the invention, methods and systems are described for round robin call control across VoIP, PSTN and mobile phone ("Mobile") Interfaces in a multiple interface device and round robin across multiple VoIP calls for a single interface device.

In one example, a device with multiple interfaces (e.g., VoIP, PSTN and Mobile) provides round robin call control across calls in all three interfaces with a single button press on a headset. Users can answer a VoIP call with a headset button press and when a second incoming call comes on the PSTN or Mobile interface, users can press a button (e.g., Flash) on the headset and put the first VoIP call on hold and answer the incoming PSTN or mobile call. Then the user can switch between several call's on hold by simply pressing the flash button, which will put the active call on hold and make a previously held call active in a round robin fashion (each held call is made active in a circular manner with a press of the flash button).

In one example, several calls on the VoIP interface and a single call in the PSTN and Mobile interface are rotated in round robin fashion. In one example, several calls on the VoIP interface are rotated in round robin fashion. The VoIP calls can be across multiple softphones or Unified communication clients such as Avaya, Cisco and Microsoft.

In one example, a loosely coupled call state machine is implemented on a PC. A multiple interface device is operable to bring up and down specific interfaces and hold/resume a specific interface. A mechanism is provided to read the interface device hold/active states. In this manner, round robin call control across multiple interfaces is advantageously implemented.

In one example, a method for call control includes monitoring a first interface, a second interface, and a third interface for an incoming call. A notification is received of an incoming call on the first interface, the second interface, or the third interface. The method includes outputting a new call indication to a user responsive to the notification, and receiving a first user action to accept the incoming call. Responsive to receiving the first user action to accept the incoming call, a current active call is placed in a hold queue, the hold queue configured to contain calls placed on hold received over the first interface, the second interface, and the third interface. A second user action is received to place the active call on a hold status. Responsive to receiving the second user action, the incoming call is placed in the hold queue, a next call is retrieved from the hold queue, and the next call is activated. In one example, the first interface is a VoIP interface, the second interface is a PSTN interface, and the third interface is a mobile telephone interface.

In one example, a computer readable storage memory stores instructions that when executed by a computer cause the computer to perform a method for call control. The performed method includes receiving communications associated with a monitoring of a VoIP interface, a PSTN interface, and a mobile telephone interface for an incoming call. Responsive to receiving notification of a first user action to accept an incoming call, any current active call is placed in a hold queue, the hold queue configured to contain calls placed on hold received over the VoIP interface, the PSTN interface, and the mobile telephone interface. Notification of a second user action to place the active call on a hold status is received. Responsive to receiving notification of the second user action, the active call is placed in the hold queue, a next call from the hold queue is retrieved, and activated.

In one example, a telecommunications device includes a headset interface configured to communicate with a headset, a first network interface, a second network interface, and a third network interface. The telecommunications device further includes a device user interface and a processor. The telecommunications device further includes a memory storing a call control application configured to place the second network interface or the third network interface on a hold status, and activate from a hold status the first network interface, where a first connected call resides on the first network interface and a second connected call resides on the second network interface of the third network interface.

In one example, a system includes a telecommunications interface device and a computer in communication with the telecommunications interface device. The telecommunications interface device includes a wireless transceiver configured to communicate with a wireless headset, a first network interface, a second network interface, a device user interface, a processor, and a memory. The computer includes an Internet Protocol network interface, a processor, and a memory. The memory includes a VoIP application and a call control application configured to establish a call hold queue includes incoming calls received on the first network interface, the second network interface, and the Internet Protocol network interface and placed on hold by a user. In one example, the call control application is further configured to place a current active call in the call hold queue responsive to a user action and retrieve and activate a next call stored in the call hold queue.

FIG. 1 illustrates a simplified block diagram of a system for telephony call control in one example. As shown in FIG. 1, a processor-based host 2 includes a processor 8 which controls hardware and executes application software or firmware residing on computer-readable memory on the host. For example, the processor 8 executes software or firmware applications such as a call control application 12 performing functions described herein, VoIP softphone application 14, and VoIP softphone application 15 residing in computer readable memory 10. The number of VoIP softphone applications shown is for illustration only, and any number of VoIP softphone applications may reside on the processor-based host 2. For example, computer readable memory 10 may be a RAM device or ROM device. Alternatively, call control application 12, VoIP softphone application 14, and VoIP softphone application 15, may reside on any other computer readable storage media that can store data readable by a computer system. Examples of computer readable storage media include hard disks, optical media, and specially configured hardware devices such as application-specific integrated circuits (ASICs). Processor-based host 2 includes a host USB controller.

The processor-based host 2 may be in communication with one or more networks for receiving incoming and sending outgoing communication calls. The network may be for example, an Internet Protocol Network 40, an intranet network, or a LAN (local area networks). Although not shown, the network may be in communication with other networks including, for example, a public switched telephone network (PSTN) or a Private Branch Exchange (PBX) for completing a communication call on a remote end to a remote call recipient or remote caller. The processor-based host 2 generally can be any suitable processor-based device such as a personal computer (PC), a personal digital assistant (PDA), and a processor-based telephone. Although shown as separate components, the host 2 and the MID 4 may be integrated as a single component.

The term VoIP softphone application generally refers to a telephony application running on a PC or other processor-based host, and may also be referred to as a VoIP telephony application. Processor-based host 2 includes a network interface 18 for operable to connect to Internet Protocol communications network 40 using a connection 41. Processor-based host 2 includes a USB interface 16 for mating to a corresponding USB interface 22 on a multiple interface device 4.

As shown, the MID 4 is in communication with the host 2 such as via a connection to a Universal Serial Bus (USB) port provided on the host 2 or any other suitable communication port or mechanism. For example, although a wired connection is typically employed between the MID 4 and the host 2, wireless connections may alternatively be employed. Thus, the term "connection" utilized herein generally refers to both wired and wireless connections.

Multiple interface device (MID) 4 is a telecommunications device including a headset interface 30 configured to communicate with a headset 6, a first network interface, a second network interface, and a third network interface. In certain examples described below, multiple interface device 4 is also referred to as the "base unit" or simply "base". In the example shown in FIG. 1, the first network interface is a USB interface 22, the second network interface is a PSTN interface 32 such as a telephone interface module (TIM) configured to communicate over a connection 43 with a telephone 36 adapted for communications over a public switched telephone network 42, and the third network interface is a mobile phone interface 34. For example, the mobile phone interface 34 is a wireless transceiver configured to communicate over a wireless connection 45 with a mobile telephone 38 adapted for wireless communications over a cellular communications network 44. For example, the wireless transceiver is a Bluetooth communications transceiver or an IEEE 802.11 transceiver. MID 4 includes a MID USB controller.

The MID 4 facilitates communication between the headset 6 and the host 2 and may optionally also serve as a cradle to facilitate storage of the headset 6 and recharging of a rechargeable battery contained in the headset 6 where headset 6 is a wireless headset. It is noted that a docking and/or charging portion or component of the MID 4 may be physically integrated with the MID 4 or may be a physically separate component from the remainder of the MID 4. The MID 4 may be powered via the USB connection but can be alternatively or additionally be powered via an external power source such as via an alternating current (AC) adapter. The external power source may facilitate the recharging of the headset 6 when the host 2 is powered down, for example, and/or may supplement the power provided via the USB connection.

As is well known, USB allows two-way communication between peripheral devices and a processor-based host 2. When the USB MID 4 is initially connected to the host 2, the host 2 (or a hub) detects the USB MID 4 and performs an enumeration process that may assign an identifier to the device and inform the host 2 computer of the capabilities of the USB MID 4 (e.g., input, output, etc). The USB MID 4 typically also informs the host 2 of its identification information, such as the vendor, product, version, serial number, and/or the like.

As with the examples described herein, the MID 4 system may be a Human Interface Device (HID). HID is a class of USB devices such as a mouse, joystick, keyboard, and the like that gives structure to the data transferred between the device and the host 2 using a generic HID driver supplied by the host 2's operating system so that the host 2 can interpret the data received from the USB device without a separate device driver specially designed for the particular HID. As an HID, the MID 4 may, during the USB enumeration process, identify itself as an HID, describe the information that it can receive and send, and describe how the data should be interpreted to the host 2, e.g., via the HID descriptor. The HID descriptor gives the host operating system knowledge of each control for the MID 4 system. Although the MID 4 system is described as an HID in the examples presented herein, the MID 4 system need not be an HID and a separate device driver may be supplied to facilitate communication between the host 2 and the non-HID MID 4 system. Furthermore, although the MID 4 system is described as being in communication with the host 2 via USB ports, various other suitable communications ports may be similarly utilized.

The multiple interface device 4 further includes a device user interface 24 and a processor 20. The multiple interface device 4 further includes a memory 26 storing a call/interface control application 28 performing the functions described herein. For example, computer readable memory 26 may be a RAM device or ROM device. Call/interface control application 28 is configured to switch between the three interfaces on the MID 4. Call/interface control application 28 provides status information and control of the interfaces to call control application 12 to execute the round robin call control.

In one example, call/interface control application 28 is configured to place the PSTN interface 32 or the mobile phone interface 34 on a hold status, and activate from a hold status the USB interface 22, wherein a first connected call is a VoIP call residing on the USB interface 22 and a second connected call resides on the PSTN interface 32 or the mobile phone interface 34.

In one example, the call/interface control application 28 is configured to place the second network interface or the third network interface on a hold status and activate from a hold status the first network interface responsive to a user action at the device user interface 24 or a headset 6 user interface. For example, the device user interface 24 is a user input button operable to perform a call flash or call hookswitch function configured to round robin between a first held call in the call hold queue, a second held Call in the call hold queue, and a current active call.

Call/interface control application 28 is configured to place any of the USB interface 22, the PSTN interface 32, and the mobile phone interface 34 on a hold status and activate from a hold status any of the USB interface 22, the PSTN interface 32, and the mobile phone interface 34. In one example, the call/interface control application 28 is configured to receive call control instructions from the processor-based host 2 associated with call activation from a hold status on the first network interface, the second network interface, or the third network interface.

In one example, headset 6 is a wireless telecommunications headset including a microphone and a speaker. In the example where headset 6 is a wireless headset, headset interface 30 is a wireless communications interface operable to communicate with the wireless headset. For example, the wireless communications interface is a Digital Enhanced Cordless Telecommunications (DECT) interface or a Bluetooth interface. Where DECT is utilized, the MID 4 further includes a MID DECT baseband microcontroller to implement DECT compliant technology. A headset DECT baseband microcontroller may also be provided in the headset 6 to communicate with the MID DECT controller. In addition to DECT and Bluetooth, other technologies, protocols and/or standards may be similarly implemented.

In operation, call control application 12 is configured to establish a call hold queue which stores incoming calls received on the first network interface on MID 4, the second network interface on MID 4, and the network interface 18 on processor-based host 2 which have been placed on hold by a user. The call control application 12 is; further configured to place a current active call in the call hold queue responsive to a user action and retrieve and activate a next call stored in the call hold queue. In one example, the call hold queue is configured to contain two or more calls placed on hold by a user. In a further example, the number and type of device interfaces and network interfaces on multiple interface device 4 is increased or decreased. For example, multiple interface device 4 may utilize four network interfaces.

Figure 2:
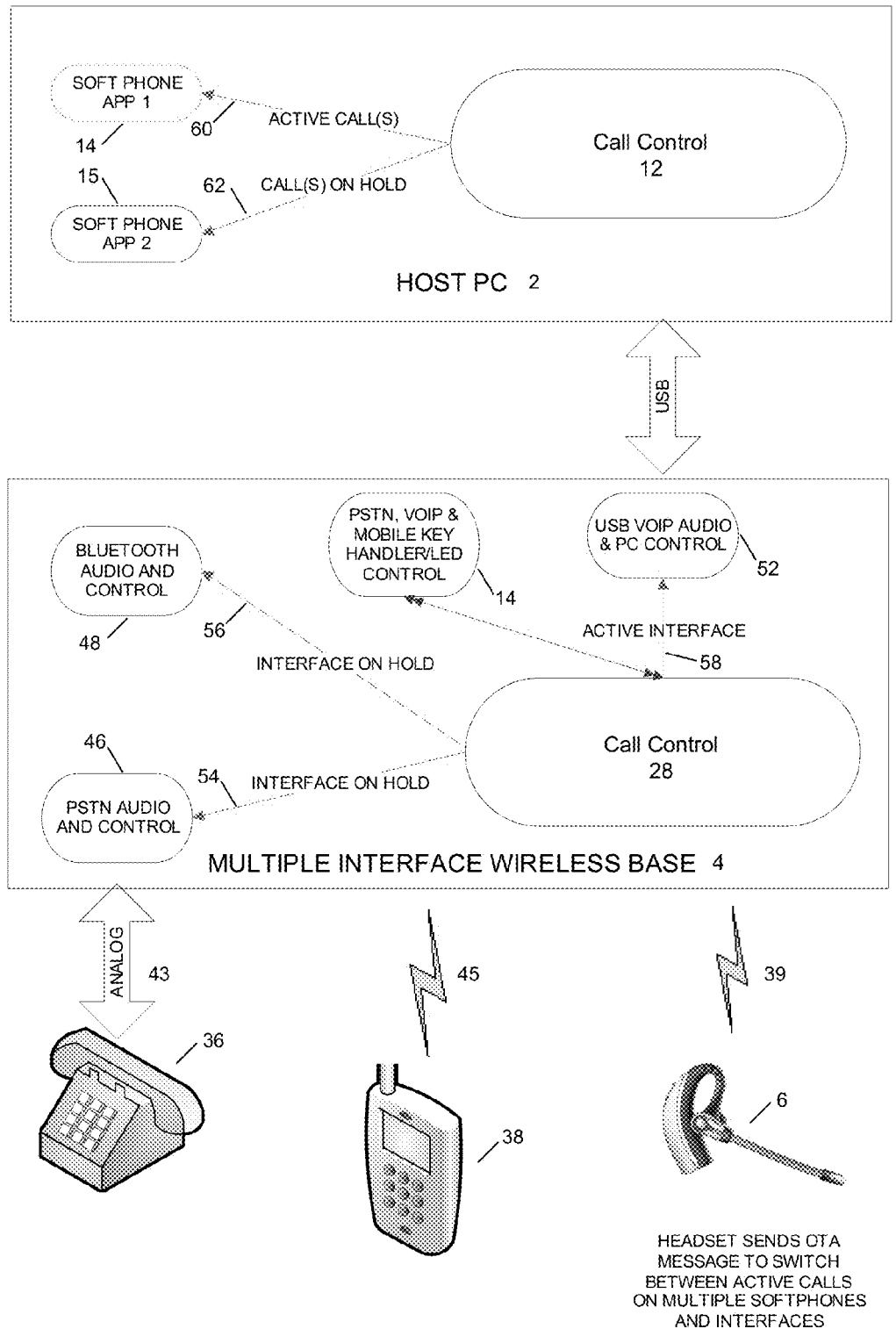
FIG. 2 is a diagram illustrating a round robin call control system in one example.

FIG. 2 is a functional diagram illustrating example operation of a round robin call control system in one example implementation of the system shown in FIG. 1. Referring to FIG. 1 and FIG. 2 together, call/interface control application 28 is configured for PSTN audio management and call control 46 across PSTN interface 32. Call/interface control application 28 is configured for Bluetooth audio management and call control 48 across a Bluetooth mobile phone interface 34. Call/interface control application 28 is configured for USB VoIP audio management and host device control 52 across USB interface 22. Connection 43 to telephone 36 is an analog connection. Connection 45 to mobile phone 38 is a wireless Bluetooth connection. Connection 39 to headset 6 is a wireless connection.

Call/interface control application 28 is configured to make active or place on hold different interfaces USB interface 22, PSTN interface 32, and mobile phone interface 34. When an interface is placed on hold, the corresponding connected call on the interface is placed in the hold queue. In the example shown in FIG. 2, there are connected calls on the PSTN interface 32, mobile interface 34, and USB interface 22. Furthermore, there are connected calls at softphone application 14 and softphone application 15 residing on host 2. Call/interface control application 28 is further configured for PSTN, VoIP and mobile phone key handler/LED control 54 at user interface 24.

In the snapshot shown in FIG. 2, a PSTN interface state 54 is in a hold state, a mobile phone interface state 56 is in a hold state, and a USB interface state 58 is in an active state. A softphone application 15 call state 62 is in a hold state, and a softphone application 14 call state 60 is an active state. Thus, the connected call at softphone application 14 is active and voice communications are conducted by a user utilizing headset 6 with a far end caller who has dialed the termination/telephone number associated with softphone application 14. Call control application 12 maintains a hold queue containing the connected calls residing on PSTN interface 32 and mobile phone interface 34 as well as the call received at softphone application 15. In one example, a user action at headset 6 operates to send an over the air message command to switch between calls on the multiple softphones and multiple network interfaces. The held calls are rotated in a round robin fashion in determining the next call to make active.

In a further example, host 2 includes a third softphone application having a connected call in a hold state. Softphone application 15 call state 62 is in a hold state, and a softphone application 14 call state 60 is an active state. In this example, there are no connected calls on PSTN interface 32 and mobile phone interface 34. USB interface state 58 is in an active state. Call control application 12 maintains a hold queue containing held calls received on multiple softphone applications (e.g., the connected calls residing on the third softphone application, softphone application 14, and softphone application 15). In one example, a user action at headset 6 operates to send an over the air message command to switch between calls on the multiple softphones in round robin fashion.

1

Figure 3:
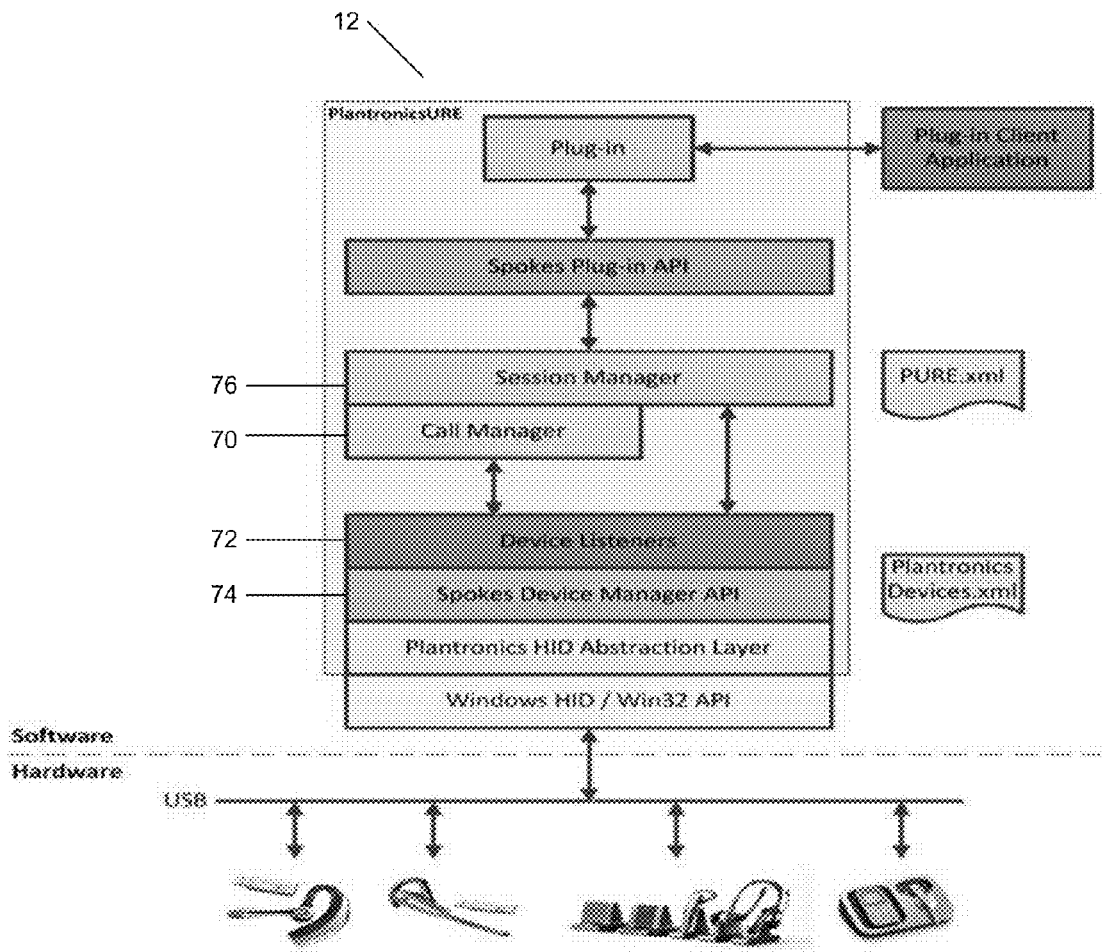
FIG. 3 illustrates an architecture for a call control application in one example.

FIG. 3 illustrates an architecture for a call control application 12 in one example. Call control application 12 includes a call manager 70, device listener 72, device manager 74, and a session manager 76.

Device manager 74 is operable to manage the MID 4. The device manager 74 includes a set of generic interfaces for host to USB device (e.g., MID 4) communication. Device manager 74 supports USB device enumeration and filtering devices based on PID, exposes USB device HID capabilities, and provides USB device arrival and removal notification. The device manager 74 supports the MID 4 based on HID. The device manager 74 exposes the MID 4 events and commands.

The device manager 74 is also configured to (1) set Ring on/off on the MID 4, (2) provide the ability to raise a radio link on any interface, (3) provide the ability to drop a radio link on any interface, (4) report Link state changes on any interface, (5) report hook switch presses, (6) report headset 6 volume UP and DOWN presses, (7) set/get the host 2 ring tone, (8) set/get the host 2 ring tone volume, (9) set/get the system tone volume, (10) set/get auto answer functionality, (11) put any interface on hold and resume, (12) set/get audio sensing, (13) to set/get an outgoing call (OC) dial tone, (14) report headset 6 in range and out of range, (15) expose OC events as reflected by the MID 4 for the call manager 70 to support OC call control, and (16) support OC Dial Tone. 100441 Device listener 72 is configured to interface with the device manager 74 and registers for all device specific events. Device listener 72 exposes a common interface for call control commands and call control events to the call manager 78. Device listener 72 handles device specific details for call control and filters device events based on the active call state. The device listener 72 exposes a common interface for device state, command and events to the session manager 76.

Call manager 70 is configured to provide an interface for accepting incoming calls from client applications. It provides a call state machine as described herein that maintains a call state of a single active call and transitions associated with the active call. The call manager 70 maintains a list of non active held calls and ringing calls. The call manager 70 interfaces with the session manager 76 and the device listener 72 and manages softphone calls. Call manager 70 supports call control on a MID 4 with a single interface (e.g., VoIP only) and a MID 4 with multiple interfaces (e.g., VoIP, PSTN, and mobile). The call manager 70 handles outgoing calls initiated from the MID 4.

The call manager 70 supports call control with supported softphones. It interfaces with the device listener 72 and supports multiple channel call control (e.g., VoIP, PSTN and Mobile). It also interfaces with the device listener 72 and registers for PSTN and Mobile Ring indications and manages call objects across all the interfaces. The call manager 70 supports hold and resume on all the interfaces.

The call manager 70 implements the call control behavior as detailed herein. It supports multiple VoIP calls from the same softphones or from different softphones. It supports multiple VoIP calls along with PSTN and mobile calls and is able to round-robin between the calls with a flash command. It maintains a Ringing Queue to handle simultaneous ringing calls on multiple interface (e.g., VoIP, PSTN and mobile).

The call manager 70 also maintains the state of an active call and a queue of held calls from multiple channels. The call manager 70 exposes metadata about its current state so an end user softphone module can display active call and held call status across all the interfaces (e.g., VoIP, PSTN and mobile).

The processor based host 2 is operable to request VoIP, PSTN, and Mobile interface UP (i.e., active) and DOWN (i.e., hold). A headset Flash button press is reported as Flash button press. The host 2 is operable to put the PSTN and Mobile Interface on Hold/Resume. PSTN and Mobile Ring indication are reported to the processor based host 2 as per HID. The MID 4 exposes all button presses as a one shot control (OSC).

Basic call control includes remote ring detection, hook switch control across all supported softphones such as Avaya, Cisco, Skype, etc. In one example operation, a headset talk button or a MID 4 button is used to accept or end a call. A flash button (either on the headset 6 or on the MID 4) is used to round robin between held calls on multiple interfaces and/or multiple softphones.

An incoming mobile call can be answered in the following ways: (a) on the mobile device handset (AG) (i.e., mobile phone 38), (b) by pressing a base "Mobile Talk" button, (c) by pressing the headset 6 "Talk" button, or (d) where an auto answer feature is enabled, undocking the headset 6 while the mobile call is ringing.

In all of the above cases, before the call is answered, the Device manager will notify the Call Manager about the Mobile incoming call. The MID 4 will indicate the mobile call by ringing the base and the mobile MID 4 LED will blink.

With the exception of case (a), the CM 70 creates a call object when the call is answered by and can set the active interface to mobile. The mobile call will be now on the headset 6 and the mobile interface will stay active on the MID 4. Any requests from host to bring up the mobile interface are prevented while it is in the process of bringing up the link. An active call on the headset 6 can be terminated by (a), (b), (c) or docking the headset 6 on the MID 4. In the case of (a), the call is answered in the handset (e.g., mobile phone 38). A call active on the handset (AG) can be transferred to the headset 6 while the handset is in range to the MID 4.

An outgoing mobile call can be initiated in the following ways (a) on the handset (AG), (b) by pressing the MID 4 "Mobile Talk" button, (c) by pressing the headset 6 "Talk" button (e.g., hookswitch button) when the default interface is Mobile, or (d) where auto answer is enabled, undocking the headset 6 when the default interface is Mobile. The device manager 74 is notified about outgoing call and the call manager 70 creates a call object and sets the active interface to Mobile when the audio location is to the headset 6.

Figure 4:
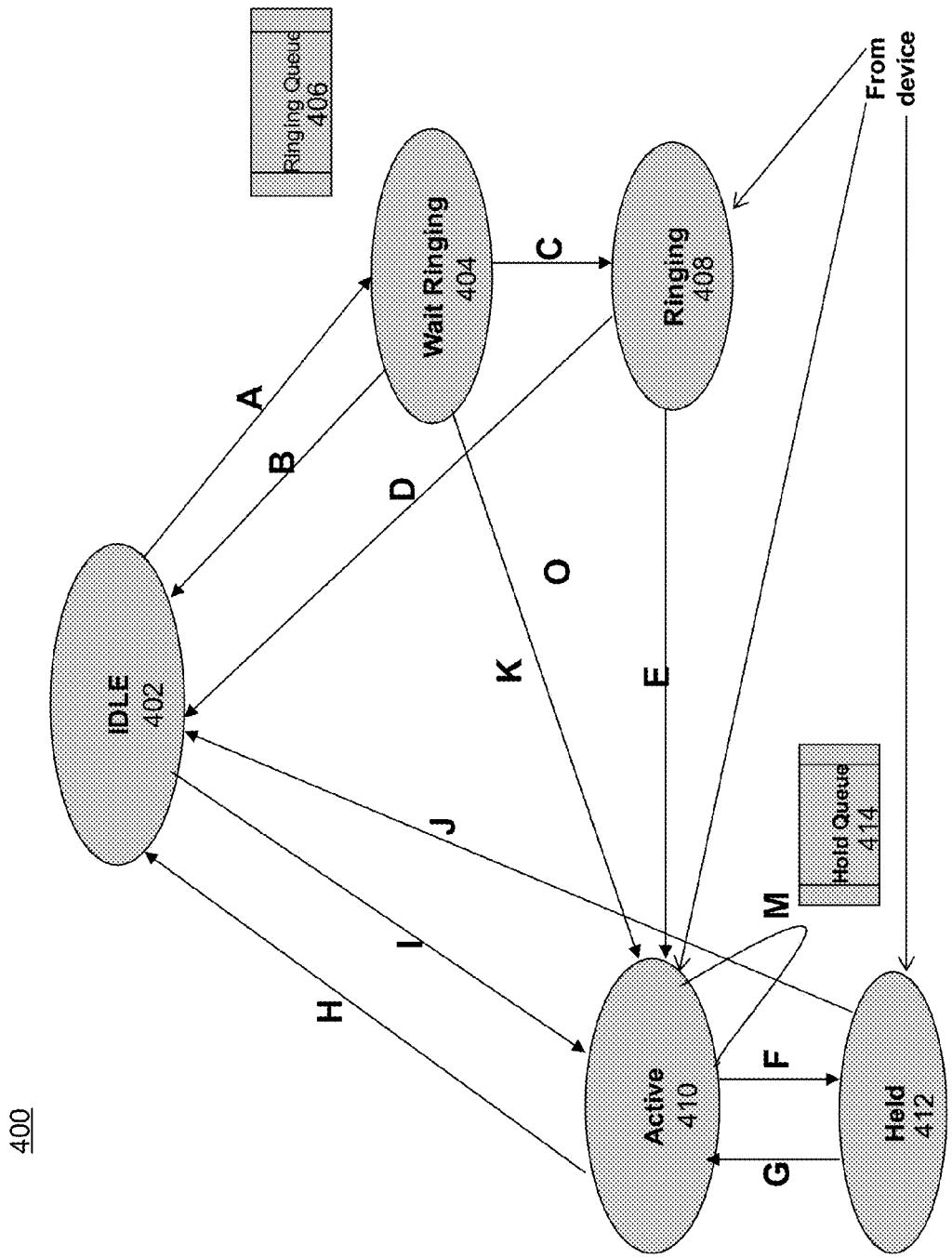
FIG. 4 is a state diagram illustrating call state transitions in one example.

FIG. 4 is a state diagram illustrating call state transitions in one example implementation. A call state machine 400 includes an idle state 402, wait ringing state 404, ringing state 408, active state 410, and hold state 412. A ringing queue 406 and a hold queue 414 are maintained.

Each call managed by the call state machine 400 (CSM) goes through a set of pre-defined states. When a transition happens from a state to next state events corresponding to exit and entry for states are executed. Appropriate actions are taken in those event handlers. The device events are received in a device event queue and processed one after the other. The CSM 400 also maintains the hold queue 414 for calls on hold and the ringing queue 406 for handling multiple simultaneous incoming' calls.

On an incoming call on any of the interfaces (e.g., VoIP, PSTN, Mobile), the call state machine 400 first creates a call instance and sets its state to be WAIT_RINGING and places it in the ringing queue. A ringing queue reader thread first checks if there is already a ringing call on the VoIP interface that is using the device ringer. If there is then it will wait until the ringing call is either accepted or rejected and the device ringer becomes free. Once the device ringer is free the ring queue reader thread will take the first call in the ringing queue and set its state to be RINGING and go back to wait on the ringing queue.

For PSTN and Mobile calls, the call manager 70 will receive notification from the device listener 72 on the PSTN and Mobile incoming calls and create call objects and queue them on the ringing queue. Depending up on the user action, such as a base button press, the call manager 70 will transition the PSTN and Mobile calls into active and idle states. Once the call reaches an idle state, the call manager 70 cleans up an internal state it maintains about the call.

For VoIP calls, depending on what action the user takes, such as pressing a talk button or accepting the call in the softphone graphical user interface (GUI), the ringing call will become active (ACTIVE, see transition E) or will be rejected (IDLE) (transition D, B).

An active call will be put on HOLD (transition F) state based on a flash button press from the device or a softphone GUI hold. An active call will be resumed and become ACTIVE (transition G) on a subsequent flash button press or a softphone GUI resume call event. "Held" calls will be added to hold queue.

If multiple calls are present/connected, there is only one active call at a time. The rest of the calls are on either hold queue 414 or ring queue 406. By pressing the flash button, an active call will be put on hold and will be added to the end of hold queue 414 and the first call in the hold queue 414 will become active. This will round robin between calls in the hold queue 414. The held calls can be on any of the interfaces VoIP, PSTN or mobile. An active call can be ended (transition H) and the call state enters an IDLE state.

Outgoing calls enter into an ACTIVE state (transition I) and subsequent transitions are allowed (such as F, G, and H). On cordless devices, an RF Link is brought up on every call (with one exception when the audio is routed to the PC speakerphone) and is brought down by the last call going to Idle.

Referring again to FIG. 4, as initiated by a softphone application, at transition A the softphone requests to render an incoming call. At transition B, the incoming call is terminated or rejected in the softphone GUI or by device talk button press. At transition C, the VoIP call from the wait ringing queue 406 is set to Ring device. At transition D, the ringing call is terminated or rejected in the softphone GUI.

At transition E, the incoming call is answered in the softphone GUI. At transition F, the active call is held via the softphone GUI. At transition G, a held call is resumed via the softphone GUI. At transition G, the call is terminated via the softphone GUI. At transition I, an outgoing call is initiated on the softphone. At transition J, a VoIP held call is terminated via the softphone GUI. At transition K, a VoIP call in ringing queue 406 is accepted in the softphone GUI.

As initiated by the multi-interface device 4 (i.e., at the MID 4 or from a' telephone coupled to the PSTN interface, a mobile phone coupled to the mobile interface, or a headset coupled to the headset interface), at transition E, the incoming call is answered by pressing a mobile phone talk button, pressing a base VoIP button, or undocking a headset.

At transition F, the active call (e.g., an active VoIP call, PSTN call, or a mobile call) is held by pressing a flash button on the headset. At transition G, a held call (e.g., a held VoIP call, PSTN call, or a mobile call) is resumed by pressing a flash button on the headset.

At transition H, the call is terminated by pressing the mobile phone talk button, the base VoIP button, or docking the headset. A base PSTN button is pressed to terminate a PSTN call and a base Mobile button pressed to terminate a mobile call.

At transition I, an outgoing call is initiated. At transition J, a VoIP, PSTN, or mobile held call may be terminated by docking the headset. At transition K, a PSTN call in the ringing queue 406 is accepted by pressing a base PSTN button in the device. A mobile call in the ringing queue 406 is accepted by pressing a base Mobile button.

Figure 5A:
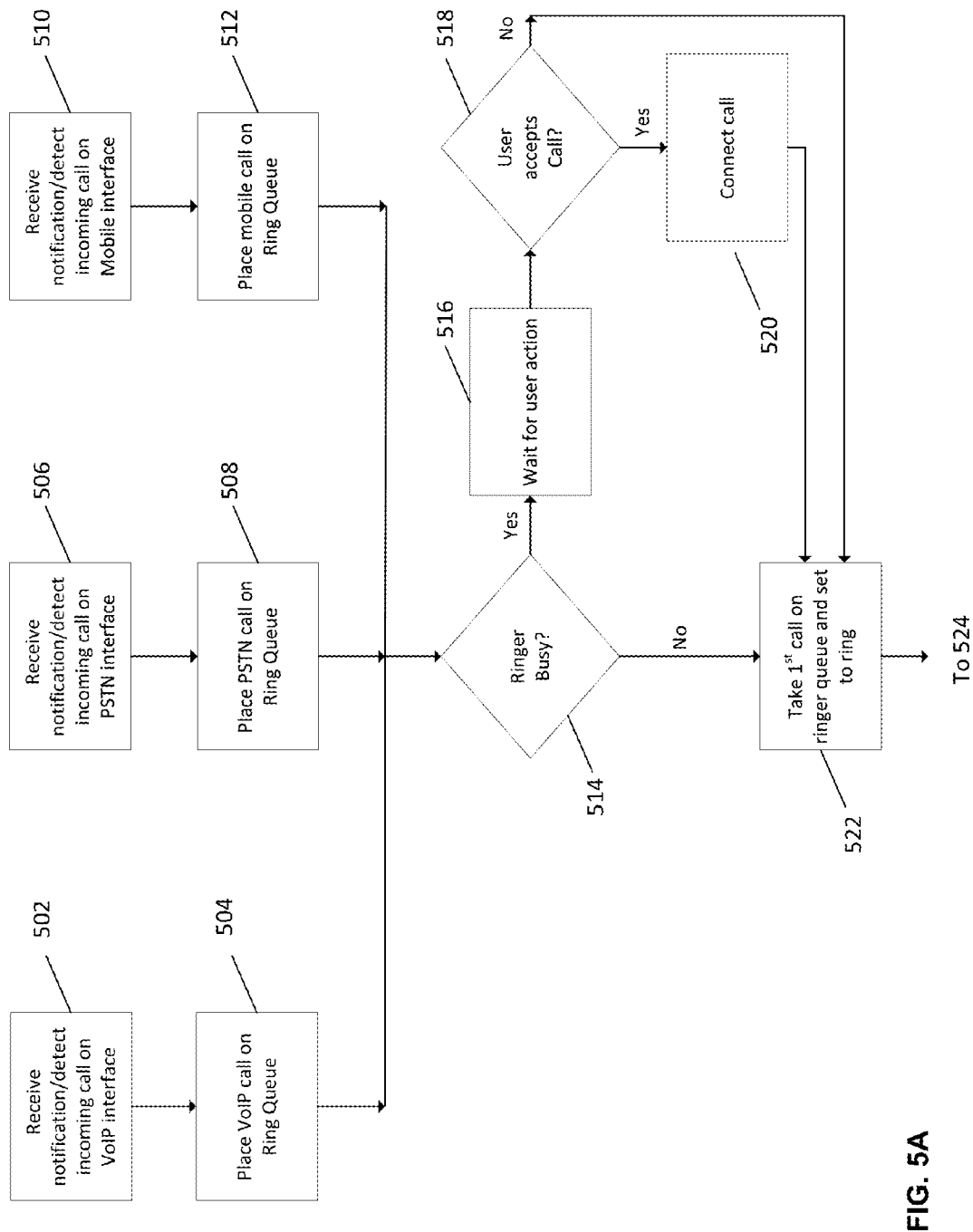
FIGS. 5A-5C are a flow diagram illustrating a method for call control in one example.
Figure 5B:
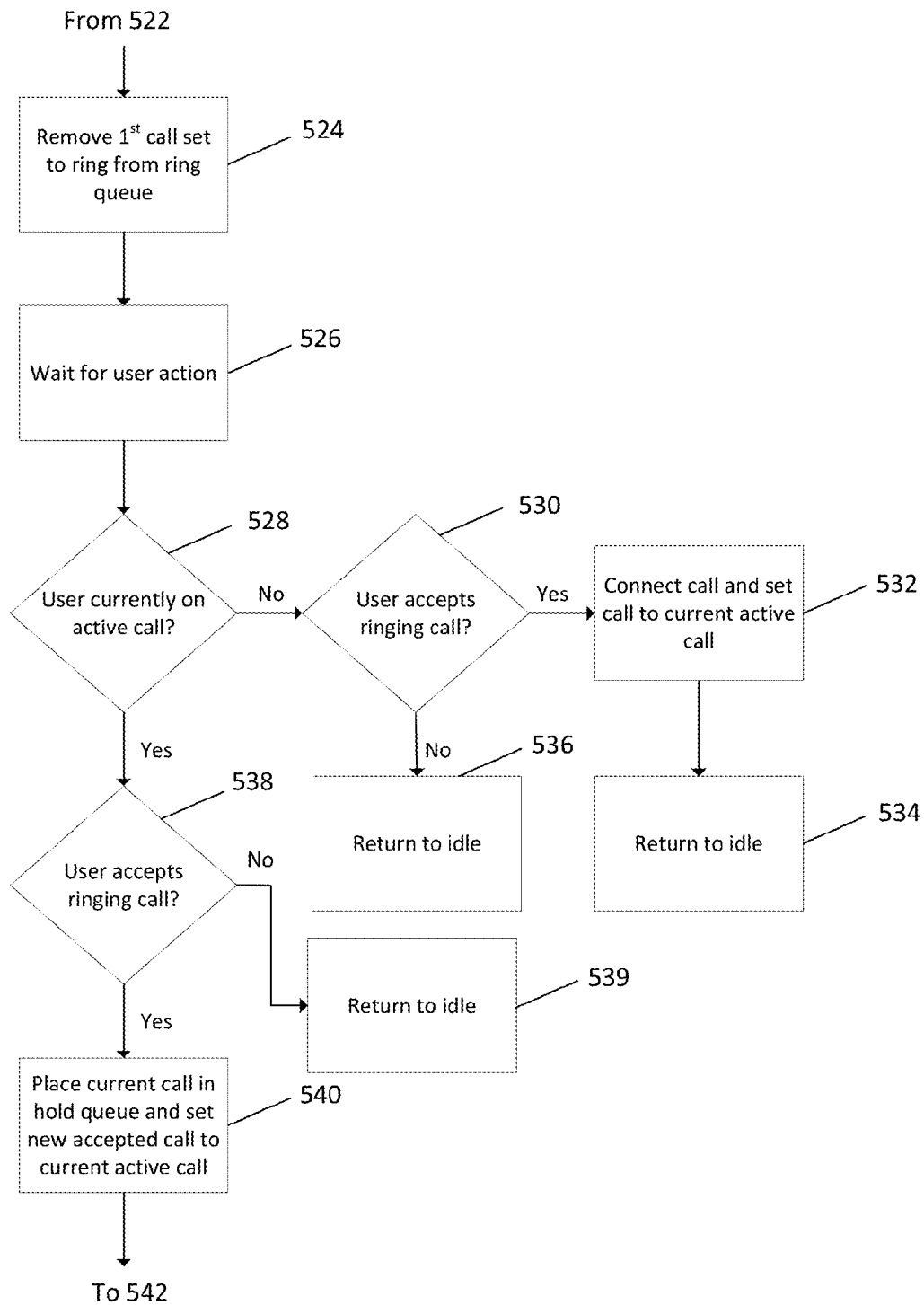
Figure 5C:
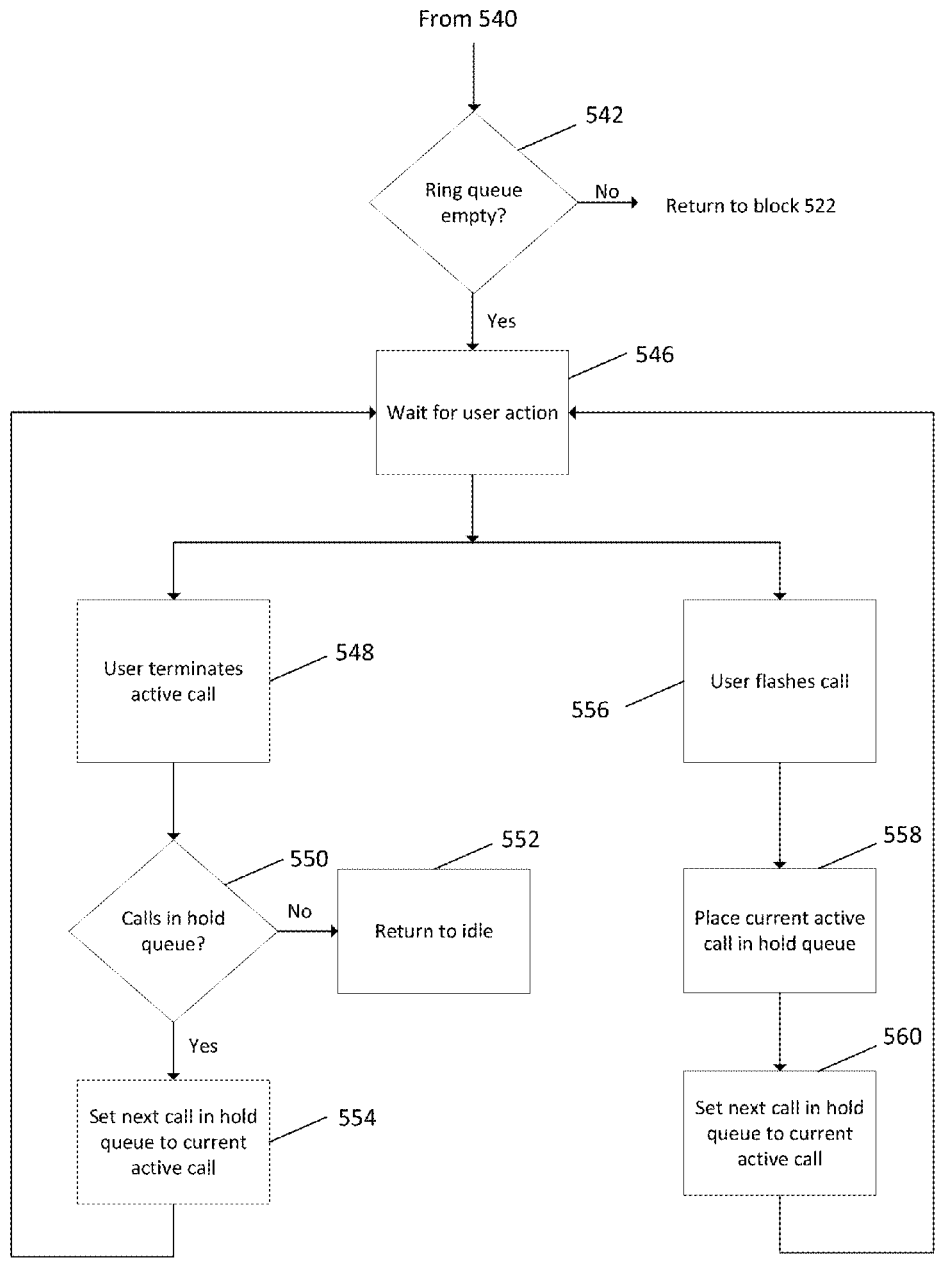

FIGS. 5A-5C are a flow diagram illustrating a method for call control in one example. At block 502, notification of an incoming call on a VoIP interface is received or detected. At block 504, the VoIP call is placed on the ring queue. At block 506, notification of an incoming call on a PSTN interface is received or detected. At block 508, the PSTN call is placed on the ring queue. At block 510, notification of an incoming call on a mobile interface is received or detected. At block 512, the mobile call is placed on the ring queue. Multiple incoming calls may be received simultaneously and after calls have been connected.

At decision block 514, it is determined whether the ringer is busy. If yes at decision block 514, at block 516 the process waits for the user action. At decision block 518 is determined whether the user accepts the current ringing call. If no at decision block 518 the process proceeds to block 522. If yes at decision block 518, at block 520 the rung call is connected.

If no at decision block 514, at block 522 the first call on the ringer queue is set to ring. At block 524, the call on the ring queue set to ring is removed from the ring queue. At block 526, the process waits for a user action.

At decision block 528, it is determined whether the user is currently on an active call. If no at decision block 528, at decision block 530 it is determined whether the user accepts the ringing call. If yes at decision block 530, the call is connected and set to the current active call. At block 534, the process returns to idle to wait for any new incoming calls. If no at decision block 530, at block 536 the process returns to idle to wait for any new incoming calls.

If yes at decision block 528, at decision block 538 it is determined whether the user accepts the ringing call. If no at decision block 539, the process returns to idle to wait for any new incoming calls. If yes at decision block 538, at block 540 the current active call is placed in the hold queue and the new accepted call is connected and set to the current active call.

At decision block 542 is determined whether the ring queue is empty. If no at decision block 542, the process returns to block 522 and the next call on the ring queue is set to ring. If yes at decision block 542, at block 546 the process waits for the next user action. If the user terminates the current active call at block 548, at decision block 550 is determined whether there are calls remaining in the hold queue. If no at decision block 550, the process returns to idle at block 552 and waits for any new incoming calls. If yes at decision block 550, at block 554 the next call in the hold queue is set to the current active call. The process then returns to block 546 to wait for the next user action.

Following block 546, if the user flashes the call at block 556, at block 558 the current active call is placed in the hold queue. At block 560, the next call in the hold queue is set to the current active call. Following block 560 the process returns to block 546 to wait for the next user action.

Figure 6:
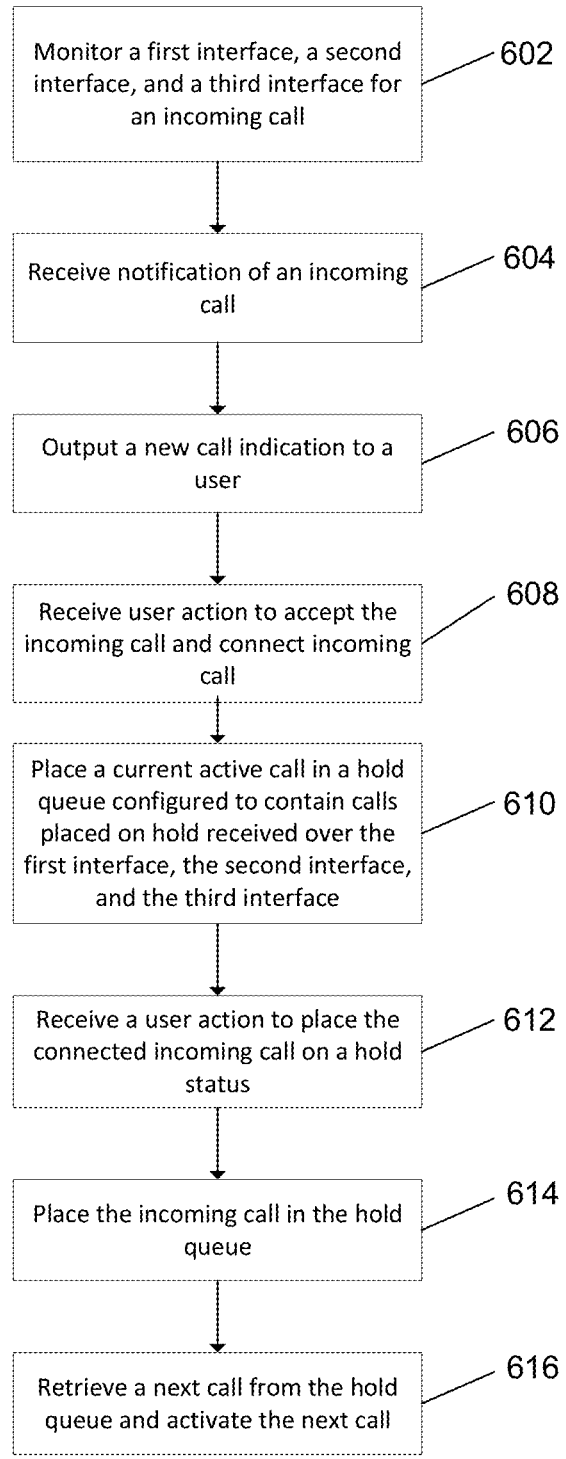
FIG. 6 is a flow diagram illustrating a method for call control in a further example.

FIG. 6 is a flow diagram illustrating a method for call control in a further example. At block 602, a first interface, a second interface, and a third interface are monitored for an incoming call. In one example, monitoring the first interface includes monitoring a first VoIP application associated with a first telephone number and monitoring a second VoIP application associated with a second telephone number. In one example, the third interface is a Bluetooth communications or IEEE 802.11 interface to a mobile telephone configured for cellular network communications.

At block 604, notification is received of an incoming call on the first interface, the second interface, or the third interface. In one example, the method further includes placing the incoming call in a ring queue, where the ring queue is configured to contain incoming calls received over the first interface, the second interface, and the third interface to set to ring.

At block 606, a new call indication is output to a user responsive to the notification. At block 608, a first user action to accept the incoming call is received and the call is connected. In one example, the first user action is a call answer user interface action at a headset. In a further example, the first user action is a call answer user interface action at a device coupled to a personal computer via a USB interface.

Responsive to receiving the first user action to accept the incoming call, at block 610, a current active call is placed in a hold queue, the hold queue configured to contain calls placed on hold received over the first interface, the second interface, and the third interface. In one example, the call hold queue is configured to contain two or more calls placed on hold by a user.

At block 612, a subsequent second user action is received to place the accepted and connected incoming call on a hold status. In one example, the second user action is a call flash user interface action at a headset. In a further example, the second user action is a call flash user interface action at a device coupled to a personal computer via a USB interface.

At block 614, responsive to receiving the second user action, the incoming call (i.e., the current active call) is placed in the hold queue. At block 616, a next call is retrieved from the hold queue, and the next call is activated. In one example, activating the next call includes connecting the next call to a headset.

Figure 7:
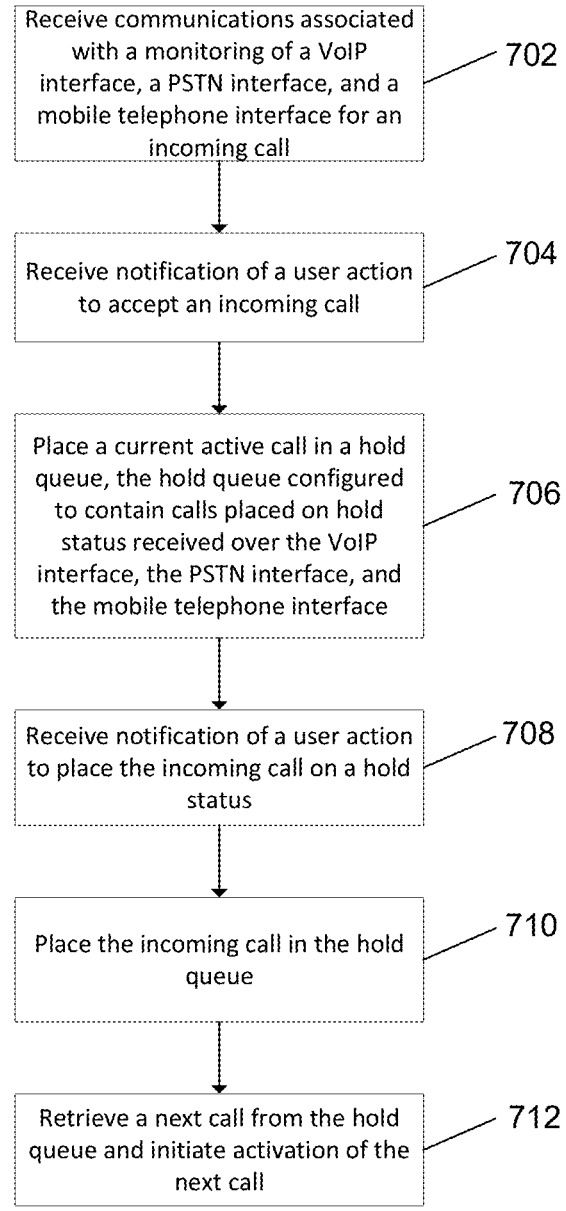
FIG. 7 is a flow diagram illustrating a method for call control in a further example.

FIG. 7 is a flow diagram illustrating a method for call control in a further example. At block 702, communications are received associated with a monitoring of a VoIP interface, a PSTN interface, and a mobile telephone interface for an incoming call. In one example, the mobile telephone interface is a Bluetooth communications or IEEE 802.11 interface to a mobile telephone configured for cellular network communications. In one example, monitoring of a VoIP interface includes monitoring a first VoIP application associated with a first telephone number and monitoring a second VoIP application associated with a second telephone number. In one example, the process further includes placing the incoming call in a ring queue, the ring queue configured to contain incoming calls received over the VoIP interface, the PSTN interface, and the mobile telephone interface to set to ring.

Responsive to receiving notification of a first user action to accept an incoming call at block 704, at block 706 a current active call is placed in a hold queue, the hold queue configured to contain calls placed on a hold status received over the VoIP interface, the PSTN interface, and the mobile telephone interface. In one example, the first user action is a call answer user interface action at a headset. In one example, the first user action is a call answer user interface action at a device coupled to a personal computer via a USB interface. In one example, the hold queue is configured to contain two or more calls placed on hold by a user.

At block 708, notification of a second user action to place the incoming call (i.e., the previously connected incoming call which is currently active) on a hold status is received. In one example, the second user action is a call flash user interface action at a headset. In one example, the second user action is a call flash user interface action at a device coupled to a personal computer via a USB interface.

Responsive to receiving notification of the second user action at block 708, at block 710 the connected incoming call (i.e., the current active call) is placed in the hold queue. At block 712, a next call from the hold queue is retrieved, and activation of the next call is initiated. In one example, activating the next call includes connecting the next call to a headset.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A method for call control comprising:
    monitoring a Voice over Internet Protocol (VoIP) interface, a public switched telephone network (PSTN) interface, and a mobile telephone interface for an incoming call, wherein monitoring the VoIP interface comprises monitoring for an incoming VoIP call to a first termination telephone number and monitoring for a VoIP incoming call to a second termination telephone number;
    receiving a notification of an incoming call on the VoIP interface, the PSTN interface, or the mobile telephone interface;
    outputting a new call indication to a user responsive to the notification;
    receiving a first user action to accept the incoming call, wherein the first user action is a call answer user interface action at a headset;
    responsive to receiving the first user action to accept the incoming call, placing a current active call in a hold queue, the hold queue configured to contain calls placed on hold received over the VoIP interface, the PSTN interface, and the mobile telephone interface;
    receiving a second user action to place the incoming call on a hold status, wherein the second user action is a call flash user interface action at the headset; and
    responsive to receiving the second user action, placing the incoming call in the hold queue, retrieving a next call from the hold queue and activating the next call.

2. The method of claim 1, further comprising placing the incoming call in a ring queue, the ring queue configured to contain incoming calls received over the VoIP interface, the PSTN interface, and the mobile telephone interface to set to ring.

3. The method of claim 1, wherein activating the next call comprises connecting the next call to a headset.

4. The method of claim 1, wherein the mobile telephone interface is a Bluetooth communications or Institute of Electrical and Electronics Engineers (IEEE) 802.11 interface to a mobile telephone configured for cellular network communications.

5. The method of claim 1, wherein the hold queue is configured to contain two or more calls placed on hold by a user.

6. One or more non-transitory computer readable storage memory storing instructions that when executed by one or more computers cause the one or more computers to perform a method for call control comprising:
receiving communications at a host computing device associated with a monitoring of a VoIP interface, a PSTN interface, and a mobile telephone interface for an incoming call, wherein the VoIP interface is disposed at the host computing device and the PSTN interface and mobile telephone interface are disposed at a multi-interface device coupled to the host computing device;
responsive to receiving a notification at the host computing device of a first user action to accept an incoming call, placing a current active call in a hold queue on the host computing device, the hold queue configured to contain calls placed on hold received over the VoIP interface, the PSTN interface, and the mobile telephone interface, wherein the first user action is a call answer user interface action at a headset;
receiving a notification of a second user action to place the incoming call on a hold status, wherein the second user action is a call flash user interface action at the headset; and
responsive to receiving the notification of the second user action, placing the incoming call in the hold queue, retrieving a next call from the hold queue and initiating activation of the next call.

7. The non-transitory computer readable storage memory of claim 6, the method further comprising placing the incoming call in a ring queue, the ring queue configured to contain incoming calls received over the VoIP interface, the PSTN interface, and the mobile telephone interface to set to ring.

8. The non-transitory computer readable storage memory of claim 6, wherein activating the next call comprises connecting the next call to a headset.

9. The non-transitory computer readable storage memory of claim 6, wherein the mobile telephone interface is a Bluetooth communications or IEEE 802.11 interface to a mobile telephone configured for cellular network communications.

10. The non-transitory computer readable storage memory of claim 6, wherein monitoring the VoIP interface disposed at the host computing device comprises monitoring for an incoming VoIP call to a first termination telephone number and monitoring for a VoIP incoming call to a second termination telephone number, and wherein the first held call is a VoIP call to the first termination telephone number and the second held call is a VoIP call to the second termination telephone number.

11. The non-transitory computer readable storage memory of claim 6, wherein the hold queue is configured to contain two or more calls placed on hold by a user.

12. A telecommunications device comprising:
a housing;
a headset interface configured to communicate with a headset;
a first network interface;
a second network interface;
a third network interface;
a device user interface, wherein the device user interface comprises a user input button disposed on an exterior of the housing, the user input button operable to perform a call flash or call hookswitch function configured to round robin between a first held call, a second held call, and a current active call;
a processor; and
a memory storing a call control application configured to place the second network interface or the third network interface on a hold status, and activate from a hold status the first network interface, wherein a first connected call resides on the first network interface and a second connected call resides on the second network interface or the third network interface.

13. The telecommunications device of claim 12, wherein the call control application configured to place the second network interface or the third network interface on a hold status and activate from a hold status the first network interface responsive to a user action at the device user interface or a wireless headset user interface.

14. The telecommunications device of claim 12, wherein the first network interface is coupled to a personal computer executing a VoIP telephony application, and wherein the call control application is further configured to receive call control instructions from the personal computer associated with call activation from a hold status on the first network interface, the second network interface, or the third network interface.

15. The telecommunications device of claim 12, wherein the headset interface is a wireless communications interface configured to communicate with a wireless headset.

16. The telecommunications device of claim 15, wherein the wireless communications interface is a Digital Enhanced Cordless Telecommunications (DECT) or Bluetooth interface.

17. The telecommunications device of claim 12, wherein the first network interface is a Universal Serial Bus interface to a personal computer and the first connected call residing on the first network interface is a VoIP call.

18. The telecommunications device of claim 12, wherein the first network interface is a Universal Serial Bus interface, the second network interface is a public switched telephone network interface configured to communicate with a telephone adapted for communications over a public switched telephone network, and the third network interface is a wireless transceiver configured to communicate with a mobile telephone adapted for wireless communications over a cellular communications network.

19. The telecommunications device of claim 18, wherein the wireless transceiver is a Bluetooth communications transceiver or an IEEE 802.11 transceiver.

* * * * *